United States Patent [19]

McClure

[11] Patent Number: 4,936,500
[45] Date of Patent: Jun. 26, 1990

[54] BOLT-TYPE BOILER WALL TUBE TOOL

[76] Inventor: Gary W. McClure, Rte. 7, Box 228-A, South Charleston, W. Va. 25309

[21] Appl. No.: 353,471

[22] Filed: May 18, 1989

Related U.S. Application Data

[63] Continuation-in-part of Ser. No. 260,293, Oct. 20, 1988, Pat. No. 4,846,391.

[51] Int. Cl.$^5$ .............................................. B23K 37/04
[52] U.S. Cl. .................................. 228/44.5; 228/49.3; 228/119; 29/272
[58] Field of Search .................... 228/44.5, 49.3, 119; 29/272, 402.13; 285/420; 269/902, 153

[56] References Cited

U.S. PATENT DOCUMENTS

| | | | |
|---|---|---|---|
| 2,612,821 | 10/1952 | Skay | 269/153 |
| 3,016,855 | 1/1962 | Wimmer | 29/272 |
| 4,047,659 | 9/1977 | Vucic | 228/119 |
| 4,750,662 | 6/1988 | Kagimoto | 228/49.3 |

FOREIGN PATENT DOCUMENTS

| | | | |
|---|---|---|---|
| 659331 | 4/1979 | U.S.S.R. | 228/49.3 |
| 698743 | 11/1979 | U.S.S.R. | 228/49.3 |
| 988510 | 1/1983 | U.S.S.R. | 228/49.3 |
| 2189177 | 10/1987 | United Kingdom | 228/44.5 |

*Primary Examiner*—Nicholas P. Godici
*Assistant Examiner*—Samuel M. Heinrich
*Attorney, Agent, or Firm*—Fleit, Jacobson, Cohn, Price, Holman & Stern

[57] ABSTRACT

This invention relates to a bolt-type boiler wall tube tool in which boiler tubes in the form of a wall can be clampingly secured to retain adjacent ends of the boiler tubes forming the wall in aligned relation when connecting the ends of the boiler wall tubes by welding.

11 Claims, 1 Drawing Sheet

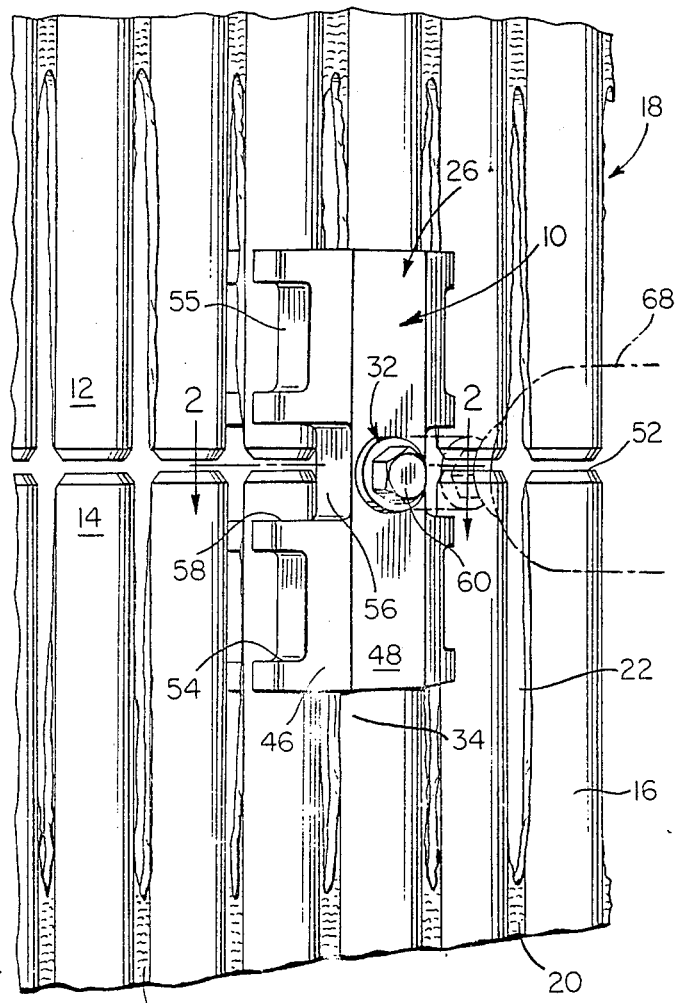
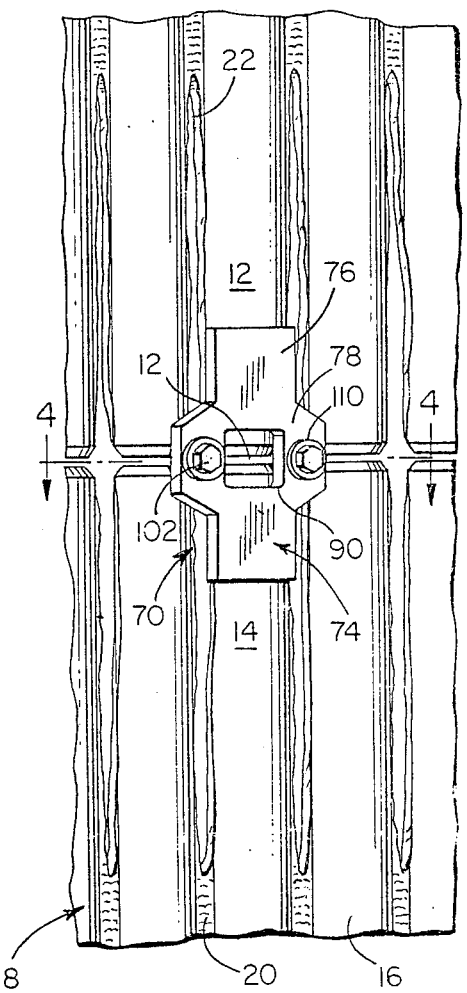
FIG. 1
FIG. 3
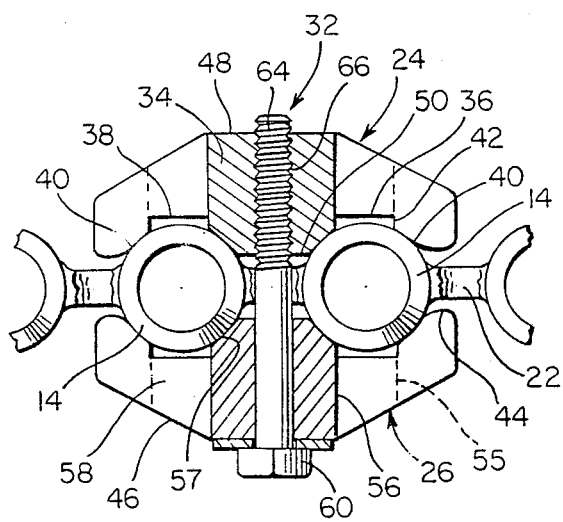
FIG. 2
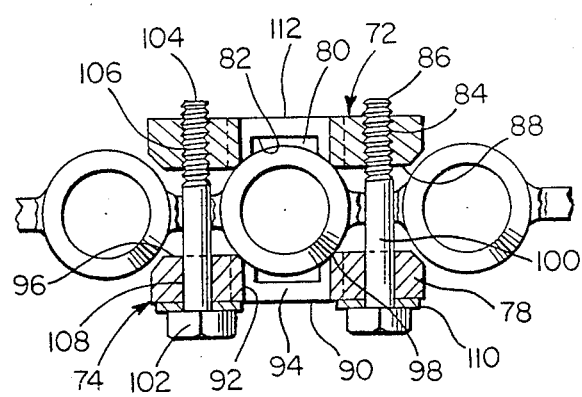
FIG. 4

BOLT-TYPE BOILER WALL TUBE TOOL

CROSS REFERENCE TO RELATED APPLICATION

This application is a continuation-in-part of my co-pending application U.S. Ser. No. 07/260,293 filed Oct. 20, 1988 for Boiler Wall Tube Tool now U.S. Pat. No. 4,836,391 issued July 11, 1989.

BACKGROUND OF THE INVENTION

1. FIELD OF THE INVENTION

The present invention generally relates to a tool for use in clampingly securing the ends of boiler tubes in aligned relation to enable the ends of the boiler tubes to be joined together by welding. More specifically, this invention relates to a boiler wall tube tool in which boiler tubes in the form of a wall can be clampingly secured to retain adjacent ends of the boiler tubes forming the wall in aligned relation when connecting the ends of the boiler wall tubes by welding.

2. INFORMATION DISCLOSURE STATEMENT.

Tools for clamping and aligning boiler tubes when connecting the ends of the boiler tubes by welding are known as disclosed in my prior U.S. Pat. Nos. 4,493,139, 4,579,272 and 4,722,468. The devices disclosed in the above-mentioned patents include structures for securing boiler tube ends in aligned and adjacent relation and function effectively when the boiler tubes are in spaced relation. However, in boiler wall tubes, the boiler tubes are positioned in closely spaced relation and are interconnected by webs to form a continuous boiler tube sheet or wall. The tools disclosed in the above-mentioned patents are not especially adapted for use with boiler tubes forming a boiler wall. Prior U.S. Pat. Nos. 2,573,276, 2,612,821, 3,422,519 and 4,047,659 cited in the abovementioned copending application also fail to disclose a structure equivalent to this invention.

SUMMARY OF THE INVENTION

An object of the present invention is to provide a bolt-type boiler wall tube tool for clampingly securing adjacent ends of boiler tubes in aligned and adjacent relation when the ends of the tubes are being connected by welding and the boiler tubes form a tube wall in the boiler.

Another object of the invention is to provide a tool in accordance with the preceding object which includes a pair of opposed clamp members interconnected by a bolt or bolts to clampingly engage adjacent ends of boiler tubes to retain them in aligned and adjacent relation with each of the clamp members including a recessed area providing access to the ends of the boiler tubes for welding.

A further object of the invention is to provide a boiler wall tube tool which includes a pair of clamp members and a single centrally located clamp bolt that can be tightened and loosened by a wrench such as an air powered wrench with each clamp member having a pair of parallel recesses receiving the adjacent ends of two boiler wall tubes.

Still another object of the invention is to provide a boiler wall tube tool in accordance with the preceding objects in which each clamp member includes a single recess engaging adjacent ends of a single boiler wall tube with a pair of clamp bolts being used to align the adjacent ends of the boiler wall tube.

Yet another object of the invention is to provide a tool for boiler wall tubes as set forth in the preceding objects which is simple to use, effective for its purposes and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a boiler wall tube assembly with the bolt-type tool of the present invention installed in operative position thereon.

FIG. 2 is a transverse, sectional view taken substantially upon a plane passing along section line 2—2 on FIG. 1 illustrating further structural details of the tool.

FIG. 3 is a perspective view of an embodiment of the tool for clamping engagement with a single boiler wall tube.

FIG. 4 is a transverse, sectional view taken substantially along section line 4—4 on FIG. 3.

DESCRIPTION OF THE PREFERRED EMBODIMENT

Referring now specifically to FIGS. 1 and 2 of the drawings, the bolt-type boiler wall tube tool of the present invention is generally designated by reference numeral 10 and is utilized to clampingly secure adjacent tube ends 12 and 14 of two boiler tubes 16 incorporated into a boiler tube wall generally designated by the numeral 18 in which the tubes 16 are spaced a short distance apart and connected by webs 20 which are continuous throughout the length of the tubes 16. In repair or replacement of the tubes 16, it is necessary to remove tube sections and replace them by welding the adjacent ends 12 and 14 together in a manner well understood in this art. In welding the adjacent ends 12 and 14 together, it is essential that they be securely clamped in aligned relation during the welding operation. The tool 10 of the present invention is utilized for this purpose and, in using the tool, it is necessary to form slots 22 in the webs 20 between adjacent tubes 16 as illustrated in FIG. 1 to receive a component of the tool 10 as described hereinafter.

The tool 10 includes an inner clamp member 24 and an outer clamp member 26 with a clamp bolt 32 adjusting the position of the outer clamp member 26 in relation to the inner clamp member 24. The inner and outer clamp members 24 and 26 are substantially identical and include a substantially rectangular body 34 of rigid construction with the body 34 including a pair of recesses 36 and 38 in the inner surface thereof with each of the recesses 36 and 38 including inclined surfaces 40 terminating at their inner ends in spaced relation and slightly offset as at 42 from the bottom of the recess which is substantially transversely flat for contacting engagement with the external surface of the tubes 16 as illustrated in FIG. 2. Outwardly of the inclined surfaces 40, the body 34 includes rounded edges 44 and inclined outer surfaces 46 which terminate in an outer flat surface 48 in parallel opposed relation to an internal flat surface 50 which extends between the edges of the inner ends of the inclined surfaces 40 as illustrated in FIG. 2. With this construction, the central portion of the clamp members 24 and 26 are thicker than the edge portions and engage adjacent tubes 16.

One end of each of the clamp members 24 and 26 engages ends 12 of two tubes 16 and the other end portion of the clamp members 24 and 26 engage the ends 14 of two tubes 16. When the clamp members 24 and 26 are moved towards each other, the tube ends 12 and 14 will be securely clamped in aligned and adjacent relation.

As illustrated in FIG. 1, the clamp members are oriented symmetrically on opposite sides of the juncture 52 between the ends 12 and 14 of the tubes 16. Each end portion of each of the clamp members 24 and 26 is provided with a recess 54 which extends from the outer curved edges 44 inwardly to a wall 55 that is perpendicular to the inner flat surface of recess 38. The end surfaces defining the recess 54 are parallel to each other and perpendicular to the longitudinal axis of each of the clamp members 24 and 26. As indicated, the recesses 54 are adjacent the ends of the clamp members and include inclined surfaces 57 which cooperate with inclined surfaces 40 to center the tube ends 12 and 14 illustrated in FIG. 2.

The central portion of each clamp member 24 and 26 is also provided with opposite recesses 58 in which the inner walls 56 forming the recesses 58 merge with the inclined surfaces 57 and are spaced inwardly from the walls 55 as illustrated in FIG. 2. The recesses 58 provide access to the juncture 52 between the tube ends 12 and 14 to enable the tube ends to be welded. The recesses 54 reduce the overall weight of the tool and provides a structure to facilitate gripping and handling of the clamp members 24 and 26.

The clamp bolt 32 includes a head 60 and a threaded portion 62 which is threaded through internally threaded bore 64 in clamp member 24. The bolt 32 extends through a slot 22 at the juncture 52 and a washer 66 is positioned between the head 60 and flat surface 48 on clamp member 26. As illustrated in FIG. 1, a power wrench such as an air wrench 68 may be used to tighten and loosen the bolt 32.

FIGS. 3 and 4 disclose an embodiment of the boiler wall tube tool designated by reference numeral 70 for clampingly securing adjacent ends 12 and 14 of a single tube 16 in a boiler tube wall 18. The structure of the boiler tube wall and the tubes 16 in FIGS. 3 and 4 is exactly the same as that in FIGS. 1 and 2 except that the alignment and securing tool 70 aligns and secures the ends 12 and 14 of a single tube 16 rather than a pair of tubes 16 as illustrated in FIG. 1. The tubes 16 are interconnected by webs 20 and slots 22 are formed therein in the same manner as in FIG. 1.

The tool 70 includes an inner clamp member 72 and an outer clamp member 74 which are of identical construction insofar as shape, size and configuration are concerned with each clamp member including a generally rectangular plate 76 having laterally extending wings 78 located centrally along each side edge thereof with the outer surface of the plate 76 being substantially planar. The inner surface of each plate is provided with longitudinal recesses 80 defined by a central flat surface 82, inclined surfaces 84 offset therefrom by short wall segments 86 perpendicular to the flat surface 82 and terminating in flat surfaces 88 defining the inner surface of the wings 78 with the inclined surfaces 84 cooperating to clampingly engage and centralize the adjacent ends 12 and 14 in relation to the clamp members 72 and 74 thereby aligning the adjacent ends 12 and 14.

The center portion of each of the clamp plates 72 and 74 includes an enlarged opening 90 defined by side walls 92 and end walls 94. The side walls 92 include flat inner surfaces 96 which have inner corners 98 engaged with the external surface of the ends 12 and 14 of the tube 16.

Each of the wings 78 are interconnected by bolts 100 having a head 102 at one end and a threaded portion 104 at the other end which is in screw threaded engagement with an internally threaded bore 106 in the inner clamp member 72 with the shank of the bolt 100 being rotatable in a bore 108 in the wing 78 on the clamp member 74. A washer 110 is positioned under the head of the bolt. As illustrated, two bolts are utilized with each of the bolts extending through slots 22 at the juncture 112 between the adjacent ends 12 and 14 of the tube 16 as illustrated in FIG. 3. By using a power wrench such as an air wrench or any other suitable type of wrench, the bolts can be quickly and easily tightened or loosened to securely clamp the adjacent ends 12 and 14 of the tube 16 in alignment to enable the beveled ends of the tube to be easily welded through the openings 90 in the clamp members 72 and 74.

When removing and replacing a section of boiler wall tubing, the webs 20 between adjacent tubes 16 are slotted or removed in the adjacent ends 12 and 14 of the tubes 16 to be connected. This enables the clamp member 24 or 72 to be positioned against the interior of the boiler tube wall 18 with adjacent ends 12 and 14 received in the recesses 36 and 38 or recess 80. The outer clamp member 26 or 74 may then be positioned against the exterior of the boiler tube wall 18 with the bolt 32 or bolts 100 extending through the slot or slots 22 and screw threaded through the inner clamp member 24 or 72 to clamp the clamp members in place thereby rigidly and securely clamping the adjacent ends 12 and 14 of the tube or tubes 16 in aligned relation with the recesses 54 or openings 90 providing access to the juncture 52 or 112 for connecting the tube ends by welding. After initial welding has been obtained, the tool can be removed and the welding connection being completed in a well-known manner.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A boiler wall tube tool comprising a pair of opposed clamp members with each clamp member including at least one recess therein to engage adjacent ends of a boiler wall tube on opposite sides of a juncture between the adjacent ends, means moving the clamp members towards each other for secure clamping engagement with adjacent ends of the tube for maintaining them in alignment while connecting the ends of the tube by welding, each clamp member including means providing access to the periphery of the juncture between the ends of the tube clamped by the clamp members, said means moving the clamp members towards each other including bolt means connecting said clamp members for moving the clamp members towards each other and enabling the clamp members to be moved away from each other and to be separated, said bolt means including a headed bolt having a threaded end portion, one of said clamp members including a threaded bore extending therethrough for treadably receiving the threaded portion of the bolt with the headed end of the bolt engaging the other clamp member to enable the clamp members to be securely clamped to the adjacent ends of the tube to retain the adjacent ends of the tube in secure alignment, each of said clamp members having a pair of recesses therein receiving adjacent ends of a pair of boiler wall tubes, said bolt means including a single bolt extending centrally through said clamp members and between the pair of boiler wall tubes at the juncture between adjacent ends of the boiler wall tubes.

2. The structure as defined in claim 1 wherein said means providing access to the periphery of the juncture between the adjacent ends of the tubes includes a laterally inwardly extending centrally disposed recess in each side edge of each clamp member in alignment with the juncture between the adjacent ends of the pair of tubes thereby providing access to a substantial portion of the periphery of the adjacent ends of the pair of tubes both interiorly and exteriorly of the boiler wall formed by the tubes.

3. The structure as defined in claim 2 wherein the threaded bore is formed in the clamp member positioned inwardly of the boiler wall tubes with the headed end of the single bolt engaging the outer clamp member thereby rendering the head of the bolt available for engagement by a wrench exteriorly of the boiler wall formed by the tubes.

4. A boiler wall tube tool comprising a pair of opposed clamp members with each clamp member including at least one recess therein to engage adjacent ends of a boiler wall tube on opposite sides of a juncture between the adjacent ends, means moving the clamp members towards each other for secure clamping engagement with adjacent ends of the tube for maintaining them in alignment while connecting the ends of the tube by welding, each clamp member including means providing access to the periphery of the juncture between the ends of the tube clamped by the clamp members, said means moving the clamp members towards each other including bolt means connecting said clamp members for moving the clamp members towards each other and enabling the clamp members to be moved away from each other and to be separated, said bolt means including a headed bolt having a threaded end portion, one of said clamp members including a threaded bore extending therethrough for threadably receiving the threaded portion of the bolt with the headed end of the bolt engaging the other clamp member to enable the clamp members to be securely clamped to the adjacent ends of the tube to retain the adjacent ends of the tube in secure alignment, each of said clamp members having a single recess therein receiving adjacent ends of a single boiler wall tube, said bolt means including a pair of bolts extending centrally through said clamp members and between adjacent boiler wall tubes at the juncture between adjacent ends of the pair of boiler wall tubes.

5. The structure as defined in claim 4 wherein said means providing access to the periphery of the juncture between the adjacent ends of the tube includes a centrally disposed opening in each clamp member in alignment with the juncture between the adjacent ends of the tube thereby providing access to a substantial portion of the periphery of the adjacent ends of the tube both interiorly and exteriorly of the boiler wall formed by the tubes.

6. The structure as defined in claim 5 wherein a pair of threaded bores are formed in clamp member positioned inwardly of the boiler wall tubes with the headed end of the pair of bolts engaging the outer clamp member thereby rendering the heads of the bolts available for engagement by a wrench exteriorly of the boiler wall formed by the tubes.

7. In combination with a boiler tube wall formed by a plurality of closely spaced tubes rigidly connected by webs, a tool for clampingly engaging adjacent ends of a tube from which the connecting webs have been removed and retaining the adjacent tube ends in alignment while being connected by welding, said tool comprising a pair of opposed clamp members with each clamp member including recess means therein to engage adjacent ends of at least one boiler wall tube on opposite sides of a juncture between the adjacent tube ends, means moving the clamp members towards each other for secure clamping engagement with only the adjacent ends of the tube for maintaining them in alignment while connecting the ends of the tube by welding, each clamp member including means providing access to the periphery of the juncture between the ends of the tube clamped by the clamp members, said means moving the clamp members towards each other including bolt means extending between the tubes in the areas from which the webs have been removed.

8. The combination as defined in claim 7 wherein each of said clamp members includes a pair of recess means extending longitudinally in parallel relation, said bolt means including a single centrally disposed bolt having a head at one end and a threaded portion at the other end, the inner clamp member having a threaded bore in threaded engagement with the bolt to enable a power wrench to tighten and loosen the bolt thereby tightening and loosening the clamp members, said means providing access including laterally inwardly extending side edge notches on each of said clamp members in alignment with the juncture between the adjacent ends of the pair of tubes thereby enabling access to a substantial portion of the periphery of the adjacent ends of the pair of tubes.

9. The combination as defined in claim 10 wherein each of said clamp members includes a single recess means extending longitudinally on the inner surface thereof, said bolt means including a pair of bolts extending through the clamp members with the bolt having a head at one end and a threaded portion at the other, the inner clamp member including threaded bores in threaded engagement with the bolts to enable a power wrench to engage the head of the bolts for tightening and loosening the clamp members, said means providing access to the juncture between the ends of the tube including a centrally disposed opening in each of said clamp members in alignment with the juncture between the adjacent ends of the tube to enable access to a substantial portion of the periphery of the adjacent ends of the tube for welding.

10. A boiler wall tube tool comprising a pair of opposed clamp members with each clamp member including a pair of longitudinal recesses therein to receive and engage adjacent ends of a pair of boiler wall tubes on opposite sides of a juncture between the adjacent ends, bolt means moving the clamp members towards each other for secure clamping engagement of the adjacent ends of a pair of boiler wall tubes for maintaining them in alignment while connecting the ends of the tubes by welding, each clamp member including means providing access to the periphery of the juncture between the adjacent ends of the pairs of tubes clamped by the clamp members, said bolt means including a single bolt extending centrally through said clamp members and between the pair of boiler wall tubes at the juncture between adjacent ends of the boiler wall tubes, said means providing access to the periphery of the juncture between the adjacent ends of the tubes including a laterally inwardly extending centrally disposed recess in each side edge of each clamp member in alignment with the juncture between the adjacent ends of the pair of tubes thereby providing access to a substantial portion of the periphery of the adjacent ends of the pair of tubes both interiorly and exteriorly of the boiler wall formed by the tubes, the headed end of the single bolt engaging the outer clamp member thereby rendering the head of the bolt available for engagement by a wrench exteriorly of the boiler wall formed by the tubes.

11. A boiler wall tube tool comprising a pair of opposed clamp members with each clamp member including a single recess therein to engage adjacent ends of a boiler wall tube on opposite sides of a juncture between the adjacent ends, bolt means moving the clamp members towards each other for secure clamping engagement of the adjacent ends of the boiler wall tube for maintaining them in alignment while connecting the ends of the tube by welding, each clamp member including means providing access to the periphery of the juncture between the adjacent ends of the tube clamped by the clamp members, said bolt means including a pair of bolts extending centrally through said clamp members and between adjacent boiler wall tubes at the juncture between adjacent ends of the boiler wall tube, said means providing access to the periphery of the juncture between the adjacent ends of the tube including a centrally disposed opening in each clamp member in alignment with the juncture between the adjacent ends of the tube thereby providing access to a substantial portion of the periphery of the adjacent ends of the tube both interiorly and exteriorly of the boiler wall formed by the tubes, the headed end of the pair of bolts engaging the outer clamp member thereby rendering the heads of the bolts available for engagement by a wrench exteriorly of the boiler wall formed by the tubes.

* * * * *